United States Patent
Bush et al.

(10) Patent No.: US 11,922,820 B2
(45) Date of Patent: Mar. 5, 2024

(54) SYSTEM AND METHOD FOR COMMUNICATION IN MIXED AIRSPACE

(71) Applicant: THE BOEING COMPANY, Chicago, IL (US)

(72) Inventors: John Eric Bush, Bothell, WA (US); Alan Tomaszycki, Orchard, WA (US); Daniel Joseph Diessner, New Smyrna Beach, FL (US); Nedah Ibrahim, Santa Clarita, CA (US)

(73) Assignee: THE BOEING COMPANY, Chicago, IL (US)

( * ) Notice: Subject to any disclaimer, the term of this patent is extended or adjusted under 35 U.S.C. 154(b) by 130 days.

(21) Appl. No.: 17/650,278

(22) Filed: Feb. 8, 2022

(65) Prior Publication Data
US 2022/0406200 A1    Dec. 22, 2022

Related U.S. Application Data

(60) Provisional application No. 63/173,792, filed on Apr. 12, 2021.

(51) Int. Cl.
*G08G 5/00*    (2006.01)

(52) U.S. Cl.
CPC ......... *G08G 5/0082* (2013.01); *G08G 5/0013* (2013.01); *G08G 5/0026* (2013.01); *G08G 5/0043* (2013.01); *G08G 5/0052* (2013.01); *G08G 5/006* (2013.01); *G08G 5/0069* (2013.01)

(58) Field of Classification Search
CPC .. G08G 5/0082; G08G 5/0013; G08G 5/0026; G08G 5/0043; G08G 5/006; G08G 5/0069; G08G 5/045
See application file for complete search history.

(56) References Cited

U.S. PATENT DOCUMENTS

| | | | |
|---|---|---|---|
| 7,706,979 B1 * | 4/2010 | Herwitz | G08G 5/0026 |
| | | | 701/120 |
| 8,351,927 B2 | 1/2013 | Wright et al. | |
| 9,853,715 B2 | 12/2017 | Jalali | |

(Continued)

FOREIGN PATENT DOCUMENTS

WO    WO-2019086821 A1 *    5/2019

OTHER PUBLICATIONS

"Remote Identification of Unmanned Aircraft Systems", Federal Register, vol. 84, No. 250, Dec. 31, 2019 (87 pages).

(Continued)

*Primary Examiner* — Andrew W Bee
(74) *Attorney, Agent, or Firm* — The Small Patent Law Group LLC; Philip S. Hof (57) ABSTRACT

A communication system includes a traffic relay (TR) device for locating unmanned traffic in a controlled airspace. The TR device comprises one or more processors configured to perform the step of receive a status message from an unmanned aerial vehicle (UAV). The status message provides identification and location information of the UAV. The one or more processors are also configured to perform the step of generate a warning message for communication to at least one manned aerial vehicle (MAV) or a manned traffic manager (MTM) device that is communicatively connected to the at least one MAV. The warning message is based on a comparison of the location of the UAV to a designated airspace.

20 Claims, 3 Drawing Sheets

(56) References Cited

U.S. PATENT DOCUMENTS

| | | | |
|---|---|---|---|
| 10,054,941 B1 | 8/2018 | Beard | |
| 10,302,759 B1* | 5/2019 | Arteaga | G08G 5/0082 |
| 11,594,142 B1* | 2/2023 | Cleckler | G01S 5/20 |
| 2010/0315281 A1* | 12/2010 | Askelson | G08G 5/0013 |
| | | | 703/2 |
| 2014/0028485 A1* | 1/2014 | Nordlie | G01S 13/933 |
| | | | 342/36 |
| 2016/0012731 A1* | 1/2016 | Limbaugh | H04W 4/029 |
| | | | 701/120 |
| 2020/0265726 A1 | 8/2020 | Dupray et al. | |
| 2021/0065566 A1 | 3/2021 | Li et al. | |
| 2021/0241634 A1* | 8/2021 | Sarim | G08G 5/0073 |
| 2021/0343154 A1* | 11/2021 | Faccin | G08G 5/0021 |
| 2022/0076582 A1* | 3/2022 | Borgyos | G08G 5/006 |
| 2022/0406200 A1* | 12/2022 | Bush | G08G 5/0052 |

OTHER PUBLICATIONS

Extended European Search Report for related European Patent Application No. 22158952.6 dated Jun. 8, 2022 (12 pages).

* cited by examiner

SYSTEM AND METHOD FOR COMMUNICATION IN MIXED AIRSPACE

CROSS-REFERENCE TO RELATED APPLICATIONS

This application relates to and claims priority benefits from U.S. Provisional Patent Application No. 63/173,792, filed Apr. 12, 2021, which is hereby incorporated by reference in its entirety

FIELD

Embodiments of the present disclosure generally relate to the communication of data in a mixed airspace that can be occupied by more than one type of aerial vehicle.

BACKGROUND

Aerial vehicles have scheduled flight paths and assigned airspace regions that are spaced apart from other flight paths and airspace regions to regulate traffic flow and avoid conflicts. It is possible, though, for aerial vehicles to deviate from prescribed paths and regions and encroach air designated for other aerial vehicles.

There is currently a communication system and messaging protocol in place, referred to as automatic dependent surveillance (ADS), that tracks and communicates the locations of manned aerial vehicles in a given airspace for providing situational awareness to onboard human pilots of the manned aerial vehicles. The ADS system can provide awareness of other manned aerial vehicles in the vicinity of a specific manned aerial vehicle, but the ADS system currently does not provide awareness of other types of aerial vehicles, such as unmanned aerial vehicles (e.g., drones). As unmanned aerial vehicles proliferate over time to provide additional services such as food, mail, and other package delivery, surveillance, transportation, and/or the like, the presence of unmanned aerial vehicles in mixed airspace is expected to increase. The increased density of unmanned aerial vehicles may exacerbate the risk of collisions between manned and unmanned aerial vehicles.

SUMMARY

Certain embodiments of the present disclosure provide a communication system that includes a traffic relay (TR) device for locating unmanned traffic in a controlled airspace. The TR device comprises one or more processors configured to perform the step of receive a status message from an unmanned aerial vehicle (UAV). The status message provides identification and location information of the UAV. The one or more processors are also configured to perform the step of generate a warning message for communication to at least one manned aerial vehicle (MAV) or a manned traffic manager (MTM) device that is communicatively connected to the at least one MAV. The warning message is based on a comparison of the location of the UAV to a designated airspace Certain embodiments of the present disclosure provide a communication system that includes a TR device. The TR device includes one or more processors and is communicatively connected to one or more communication devices. The TR device is configured to receive, via the one or more communication devices, status messages from multiple UAVs. The status messages provide identifications and locations of the UAVs. The TR device determines a designated airspace that at least temporarily restricts UAV traffic to provide a right-of-way for MAV traffic, and generates a command message for communication to at least some of the UAVs identified in the status messages. The command message orders the UAVs that receive the command message to avoid the designated airspace.

Certain embodiments of the present disclosure provide a method communicating data. The method includes receiving, at a TR device including one or more processors, a status message from a UAV. The status message provides an identification and a location of the UAV. The method includes generating a warning message for communication to at least one MAV or a MTM device that is communicatively connected to the at least one MAV. The warning message is based on a comparison of the location of the UAV to a designated airspace.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a system and method for the communication of aircraft data between manned and unmanned aerial vehicles to enhance situational awareness of nearby aerial vehicles and reduce the risk of collisions. The system includes a traffic relay (TR) device that locates and manages unmanned aerial vehicles (e.g., unmanned traffic) in a controlled airspace. As a device for managing unmanned traffic, the TR device is also referred to herein as an unmanned traffic manager (UTM) device. The UTM device includes one or more processors.

The one or more processors of the UTM device are configured to receive a status message from an unmanned aerial vehicle (UAV). The status message provides the identification and location of the UAV (e.g., identification and location information). The one or more processors are configured to generate a warning message for communication to at least one manned aerial vehicle (MAV) or a manned traffic manage (MTM) device. The warning message, that is generated by the one or more processors of the UTM device, is based on a comparison of the location of the UAV in the status message to a designated airspace.

In an embodiment, the UTM device receives multiple status messages from multiple unmanned aerial vehicles (UAVs) in a mixed airspace. The status messages provide respective identifications and locations of the UAVs. For example, a first status message from a first UAV identifies the first UAV and provides a current location of the first UAV current. The current location refers to the location of the UAV at the time that the status message is generated. A second status message from a second UAV identifies the second UAV and provides the current location of the second UAV. The UTM device may receive the status messages via associated communication devices. The UTM device selects a subset of one or more of the UAVs (out of the UAVs associated with the status messages) based on a comparison between the locations of the UAVs and the designated airspace.

The warning message provides the respective location of each UAV in the subset for offering situational awareness of the UAVs in the subset to the pilot or pilots of the at least one MAV. The communication of UAV locations to the MAVs may improve traffic flow efficiency and reduce collision risks between the UAVs and MAVs in the mixed airspace.

The MTM device is a device that locates and manages manned aerial vehicles (e.g., manned traffic) in a controlled airspace. The MTM device may be an air traffic control device, a dispatch device, a scheduler device, or the like, that is communicatively connected to the at least one MAV.

The terms manned and unmanned in the MTM device and the UTM device, respectively, refer to the type of traffic that the devices manage, not to an occupancy status of the devices themselves. For example, both the MTM device and the UTM device may be computer-based, as described herein, and may operate independent of human input.

Figure 1:
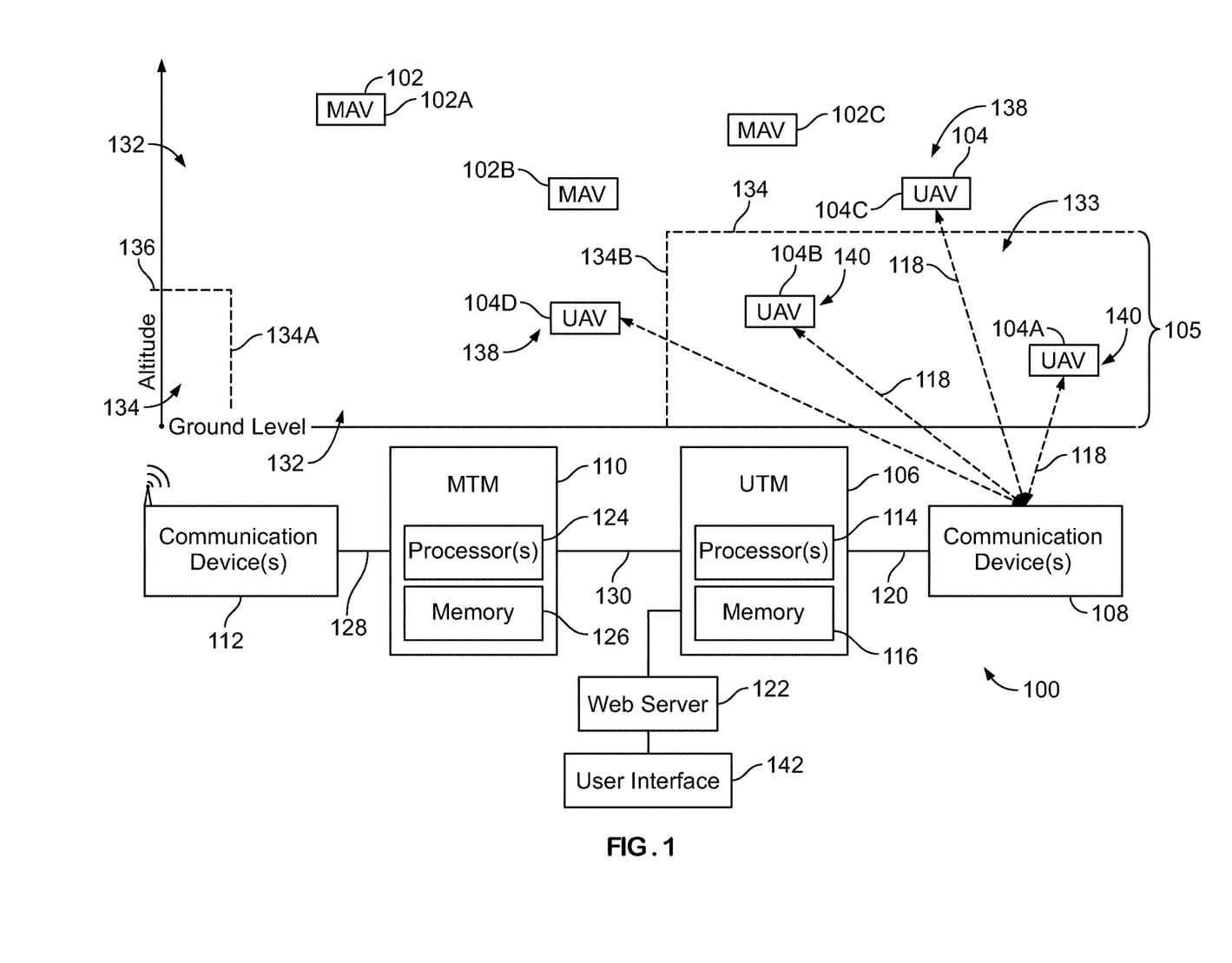
FIG. 1 is a schematic block diagram of a communication system, according to an embodiment of the present disclosure.

FIG. 1 is a schematic block diagram of a communication system 100 according to an embodiment. The communication system 100 may be an aircraft data communication system that communicates data, such as information and commands, relating to aerial vehicles (e.g., aircraft). The communication system 100 communicates with various aerial vehicles, or aircraft, in flight. The aerial vehicles include manned aerial vehicles (MAVs) 102 and unmanned aerial vehicles (UAVs) 104.

The MAVs 102 refer to aerial vehicles that are controlled or piloted by a person (e.g., a human) onboard the respective aerial vehicle. For example, the MAVs 102 may be commercial jets, private jets, propeller aircraft, helicopters, and the like. The UAVs 104 refer to aerial vehicles that are not controlled or piloted by a person onboard. For example, UAVs 104 may be devoid of people onboard. Optionally, a UAV 104 can refer to an aerial vehicle that has at least one passenger onboard, but is not piloted by any of the onboard passengers.

The UAVs 104 may be fully autonomously controlled (e.g., via an autopilot system that pilots an entire trip of the UAV 104) or remotely controlled by an off-board source, such as a human operator using a remote control device or a control device located at within a stationary facility or onboard another aerial vehicle. The UAVs 104 may be quad-copters, drones, or the like.

The communication system 100 facilitates communication between the MAVs 102 and the UAVs 104 in a mixed airspace 105. The mixed airspace 105 refers to a volume of air or space that may be occupied by both MAVs 102 and UAVs 104. As used herein, the mixed airspace 105 is based on physical capabilities of the MAVs 102 and the UAVs 104 rather than permissions and/or regulations.

For example, an altitude range from 1000 feet to 5000 feet may be referred to a mixed airspace if the space can be occupied by at least one of the MAVs 102 and at least one of the UAVs 104, even if the UAVs 104 are not permitted or allowed to exceed 1000 ft to enter the mixed airspace 105. The airspace above and proximate to an airport for MAVs 102 may be considered a mixed airspace herein if the UAVs 104 are able to access the airspace (e.g., there are no physical fences or other barriers that would prevent access), even though such access would be prohibited. In another example, an altitude range from 15,000 ft to 20,000 ft may not be a mixed airspace 105 if none of the UAVs 104 are capable of reaching at least 15,000 ft in altitude.

According to one or more embodiments, the communication system 100 may collect and analyze data relating to locations of the UAVs 104 over time. The communication system 100 optionally may also collect and analyze data relating to locations of the MAVs 102. Based on the data, the communication system 100 shares information with the entities that control the MAVs 102 and the UAVs 104 for purposes of situational awareness and collision avoidance.

For example, the communication system 100 can inform a specific MAV 102 about the presence of one or more UAVs 104 within a restricted airspace, within a designated proximity of the MAV 102, or within a designated proximity of a scheduled flight path of the MAV 102. The received information from the communication system 100 may increase the situational awareness of the MAV 102. For example, the MAV 102 may incorporate location information of the one or more UAVs 104 within a dynamic map or surveillance system that also includes the locations of other MAVs 102. The MAV 102 may navigate according to the updated dynamic map or surveillance system to avoid potential collisions or interference with both UAVs 104 and other MAVs 102 during a trip. Known systems do not integrate UAV location information with MAV location information, so there is a risk of collisions between MAVs and UAVs.

In at least one embodiment, the communication system 100 can filter and curate the information that is provided to the different MAVs 102 based on a determined relevancy to the specific MAVs 102. For example, the communication system 100 may notify a specific MAV 102 about a subset of one or more UAVs 104 which are determined to be relevant to the specific MAV 102, and may not notify the specific MAV 102 about other UAVs 104, not in the subset, which are determined to not be as relevant to the specific MAV 102. Filtering the information prior to communicating the information to a MAV 102 may avoid overloading the MAV 102 or a pilot thereof with excessive information to process. The relevancy determination may be based, at least in part, on proximity of the respective locations of the UAVs 104 to the specific MAV 102. For example, UAVs 104 that are closer to the MAV 102 or to a scheduled flight path of the MAV 102 may be more relevant to the MAV 102 than UAVs 104 that are located farther away from the MAV 102, which would be less likely to collide with and/or interfere with the MAV 102. This filtering function is performed, entirely or at least in part, by the TR device (e.g., the UTM device).

The communication system 100 in the illustrated embodiment includes the TR device 106, referred to herein as the UTM device. The communication system 100 also includes one or more communication devices 108 that are communicatively connected to the UTM device 106. In at least one embodiment, the communication system 100 also includes the MTM device 110 and one or more communication devices 112 that are communicatively connected to the MTM device 110. For clarity in the description, the one or more communication devices 108 are referred to as one or more first communication devices 108 (or simply as a first communication device 108), and the one or more communication devices 112 are referred to as one or more second communication devices 112 (or simply as a second communication device 112).

The UTM device 106 is a computing device, such as a computer, server, or the like. The UTM device 106 represents hardware circuitry that includes and/or is connected with one or more processors 114 (e.g., one or more microprocessors, integrated circuits, microcontrollers, field programmable gate arrays, etc.). The UTM device 106 includes and/or is connected with a tangible and non-transitory computer-readable storage medium (e.g., memory) 116. For example, the memory 116 may store programmed instructions (e.g., software) that is executed by the one or more processors 114 to perform the operations of the UTM device 106 described herein. Although the processors 114 and the memory 116 are illustrated as two different components in FIG. 1, the components optionally may be integrated into a single processing component with data storage functionality.

In an embodiment, the UTM device 106 functions as a filter and mediator that facilitates the distribution of information between the MAVs 102 and the UAVs 104. For example, the MAVs 102 communicate with each other and with the MTM device 110 according to a first communication system that includes one or more specific message formats, a specific communication protocol, and/or specific communication equipment (e.g., hardware).

The first communication system may be pre-existing and currently implemented. In a non-limiting embodiment, the specific communication protocol utilized by the MAVs 102 and the MTM device 110 is an automatic dependent surveillance (ADS) protocol, which includes an automatic dependent surveillance broadcast (ADS-B) format and an automatic dependent surveillance rebroadcast (ADS-R) format. The UAVs 104 may be configured to communicate with one another and/or the UTM device 106 via another communication system that has a different messaging format, a different communication protocol, and/or different communication equipment (e.g., hardware) than the communication system utilized by the MAVs 102.

For example, the UAVs 104 communicate messages using an unmanned aircraft systems traffic management (UASTM) format, which is different from the ADS-B and ADS-R formats. The UTM device 106 can facilitate communication between the MAV communication system and the UAV communication system by interpreting and analyzing data received in any of the message formats, and converting data between the different message formats, as described herein.

The UTM device 106 receives at least one status message from one or more of the UAVs 104. In an embodiment, each of multiple UAVs 104 periodically communicate status messages that are received by the UTM device 106. The status messages provide respective identifications and locations of the UAVs 104. For example, a status message generated by a first UAV 104A may include a unique identifier that is associated with the first UAV 104A, such as a serial number or registration number. The status message generated by the first UAV 104A also includes respective location information of the first UAV 104A.

In an embodiment, the location information may be absolute positional coordinates within a coordinate system. For example, the location information may be global positioning system (GPS) coordinates of the first UAV 104A at the time that the status message is generated. The UAVs 104 may have a GPS receiver disposed onboard. The status messages are communicated from each of the UAVs 104. There are four UAVs 104 shown in FIG. 1, but any number of UAVs 104 may be tracked by the UTM device 106 according to the embodiments described herein.

The status messages are received by the first communication device 108. The first communication device 108 can include a transceiver that both receives messages and communicates (e.g., broadcasts or transmits) messages, or may have a receiver and a discrete transmitter that separately perform the receive and communicate functions. The first communication device 108 also includes associated circuitry and other hardware, such as one or more antennas, parabolic dishes, amplifiers, power supply devices, wires, and the like. The first communication device 108 may be configured to establish a communication link 118 with each of the UAVs 104. Each communication link 118 may be a bi-directional wireless communication pathway and/or protocol between the first communication device 108 and a specific UAV 104. In a non-limiting embodiment, the communication link 118 may be a 5G wireless communication link.

In an embodiment, the status messages have a first message format. As described above, the first message format of the status message may be the UASTM format. The first communication device 108 receives the status messages in the first message format and forwards the status messages to the UTM device 106. In an embodiment, the first communication device 108 is communicatively connected to the UTM device 106 via a wired communication pathway 120 that is electrically and/or optically conductive. In an alternative embodiment, the first communication device 108 is wirelessly connected to the UTM device 106, such as via Bluetooth, a wireless LAN router, or the like. The status messages may be communicated from each UAV 104 on a periodic schedule, such as once every 10 seconds (s), every 30 s, or every minute.

The UTM device 106 analyzes the status messages that are received via the first communication device 108 to determine updated respective locations of the UAVs 104. The UTM device 106 may store the updated respective locations of the UAVs 104 along with the UAV identification information in the memory 116, which enables the UTM device 106 to track the movement of the UAVs 104 over time.

For example, the UTM device 106 can determine that at time $t_1$ the first UAV 104A is at positional coordinates ($x_1$, $y_1$, $z_1$), and at time $t_2$ the first UAV 104A is at positional coordinates ($x_2$, $y_2$, $z_2$). Optionally, instead of or in addition to storing the location data in the memory 116, the UTM device 106 may upload the location data to a web server (web-based server) 122 for off-board storage.

The MTM device 110 is a computing device, such as a computer, server, or the like. The MTM device 110 represents hardware circuitry that includes and/or is connected with one or more processors 124 (e.g., one or more microprocessors, integrated circuits, microcontrollers, field programmable gate arrays, etc.). The MTM device 110 includes and/or is connected with a tangible and non-transitory computer-readable storage medium (e.g., memory) 126. For example, the memory 126 may store programmed instructions (e.g., software) that is executed by the one or more processors 124 to perform the operations of the MTM device 110 described herein.

The MTM device 110 is communicatively connected to the second communication device 112. The second communication device 112 is configured to communicate (e.g., broadcast or transmit) messages to, and receive messages from, the MAVs 102. The second communication device 112 may also be configured to communicate with satellites and other communication devices.

The second communication device 112 can include a transceiver that both receives messages and communicates (e.g., broadcasts or transmits) messages, or may have a receiver and a discrete transmitter that separately perform the receive and communicate functions. The second communication device 112 also includes associated circuitry and other hardware, such as one or more antennas, parabolic dishes, amplifiers, power supply devices, wires, and the like.

The second communication device 112 may be communicatively connected to the MTM device 110 via a wired communication pathway 128 that is electrically and/or optically conductive. In an alternative embodiment, the second communication device 112 may be wirelessly connected to the MTM device 110, such as via Bluetooth, a wireless LAN router, or the like.

In an embodiment, the second communication device 112 may receive status signals from the MAVs 102 that include respective identifications of the MAVs 102 and locations of the MAVs 102. The second communication device 112 may forward the status signals from the MAVs 102 to the MTM device 110, which may monitor and track the locations of the MAVs 102.

For example, the MTM device 110 may be a component of an air traffic controller that schedules and modifies flight paths for MAVs 102. The communications between the MTM device 110, the second communication device 112, and the MAVs 102 may be in a specific format and/or protocol, such as ADS-B and ADS-R, that differs from the UAV system communications.

The UTM device 106 is configured to communicate with the MTM device 110. For example, the UTM device 106 may be communicatively connected to the MTM device 110 via a wired communication pathway 130, such as an electrical wire or an optical fiber. In an alternative embodiment, the communication pathway between the MTM device 110 and the UTM device 106 may be wireless, such as via Bluetooth, a wireless LAN router, or the like.

In one or more embodiments, the UTM device 106 is configured to determine a designated airspace 132. The designated airspace 132 represents a three-dimensional space that is restricted for UAV traffic, such that the UAVs 104 are not permitted to be present and occupy the designated airspace 132. The restriction may be temporary, such as in the case of an emergency no-fly zone, or permanent, such as in the case of the airspace above and surrounding an airport for MAVs. By prohibiting UAV traffic, the designated airspace may provide a right-of-way for MAV traffic.

The UTM device 106 may determine the designated airspace 132 by determining positional coordinates of the designated airspace 132 and/or boundaries 134 or borders of the designated airspace 132. For example, the boundaries 134 may be defined by positional coordinates in a coordinate system, such as GPS coordinates, longitude and latitude coordinates, and/or the like. The boundaries 134 are virtual, and may represent a geofence.

The designated airspace 132 may be a patchwork of one or more sub-airspaces. Examples of sub-airspaces may include predefined classes of airspace according to a classification scheme, such as the Class A, B, C, D, and D airspaces according to United States (US) Federal Aviation Administration (FAA) regulations. The predefined classes of airspace may be defined relative to airports for MAVs. For example, the airspace above and surrounding an airport for MAVs may be considered a sub-airspace. Another example of a sub-airspace that defines at least a portion of the designated airspace 132 may be an airspace that is across a jurisdictional boundary or border, such as airspace above a non-US country or territory. Another example may include an airspace above a threshold altitude 136, such as 300 feet, 400 feet, 500 feet, or the like, above ground level.

In the non-limiting example shown in FIG. 1, the designated airspace 132 is defined by the sub-airspace above the threshold altitude 136 and the sub-airspace below the threshold altitude 136 that is between a first boundary 134A and a second boundary 134B. The first and second boundaries 134A, 134B may be two points along a three-dimensional geofence that surrounds an airport or another location where UAV traffic is restricted.

In yet another example, the designated airspace 132 or a sub-airspace may be based on a current location or a scheduled flight path of at least one of the MAVs 102. For example, if the known current and expected locations of the MAVs 102 are known, then the designated airspace 132 may be defined based on the known location and/or expected location. Even if the UAVs 104 are typically permitted to fly within a given airspace, once it is determined that a MAV 102 is scheduled or expected to occupy that airspace along a route, the UAVs 104 may be prohibited from entering the airspace, at least temporarily, to avoid double-occupancy of the airspace.

The UTM device 106 may store predetermined restricted airspaces within the memory 116. For example, the memory 116 may include a database that is updated to include locations and boundaries of known Class A, B, C, D, and/or E airspaces, altitude thresholds (e.g., threshold 136), and the like. The UTM device 106 may determine the designated airspace 132 based on the information stored in the database.

In an embodiment, the UTM device 106 may determine the designated airspace 132 based on messages received from off-board sources, such as messages received from the MTM device 110. For example, the MTM device 110 may generate a notification message that provides the UTM device 106 with a flight path of a MAV 102, such as scheduled flight path or an emergency flight path. Upon receipt, the UTM device 106 determines that the flight path itself, and optionally a buffer region surrounding the flight path, represents the designated airspace 132.

In another example, the MTM device 110 may generate a query message that provides a specific defined airspace (e.g., based on positional coordinates), and asks whether any UAVs 104 are in or close to the specific defined airspace. In response to receipt of the query message, the UTM device 106 may classify the specific airspace in the query as the designated airspace 132.

The UAVs 104 are permitted to fly within a non-designated airspace 133 that is outside of the designated airspace 132 but within the mixed airspace 105. The MAVs 102 do not fly within the non-designated airspace 133. It is noted that the non-designated airspace 133 is the space outside of the designated airspace 132, and a given space can be reclassified between "designated" and "non-designated", such as in the case of emergency right-of-ways, temporary no-fly zones, and the like.

In the illustrated embodiment, the designated airspace refers to airspace reserved, at least temporarily, for MAV traffic at the expense of UAV traffic. Optionally, the designated airspace may refer to an airspace reserved, at least temporarily, for UAV traffic at the expense of MAV traffic.

In the illustrated embodiment, the UAVs 104 include a first UAV 104A, a second UAV 104B, a third UAV 104C, and a fourth UAV 104D. The UTM device 106 is configured to compare the respective locations of the UAVs 104A-104D (based on the received status messages from the UAVs) to the known boundaries and/or coordinates of the designated airspace 132. From this comparison, the UTM device 106 can determine relative and/or absolute proximity of the UAVs 104A-104D to the designated airspace 132.

For example, in FIG. 1, the UTM device 106 detects that the first and second UAVs 104A, 104B are outside of the designated airspace 132, while the third and fourth UAVs 104C, 104D are within the designated airspace 132. Both the third and fourth UAVs 104C, 104D occupy airspace that is restricted from UAV traffic and expected to be free of UAVs 104. The third UAV 104C is above the threshold altitude 136 in an altitude range that is reserved for MAVs 102. The fourth UAV 104D is across the boundary 134B, and may be within a predefined FAA class of airspace, too close to an airport, and/or the like. Both the third and fourth UAVs 104C, 104D are in violation, and could interfere with or pose a threat against the MAVs 102.

The third and fourth UAVs 104C, 104D represent a subset 138 of the UAVs 104A-104D. The UTM device 106 selects the subset 138 based on the comparison (e.g., proximity) between the respective locations of the UAVs 104 and the designated airspace 132, as described above. The first and second UAVs 104A, 104B represent a non-selected subset 140 of the UAVs based on the UTM device 106 determining that the first and second UAVs 104A, 104B are located farther from the designated airspace 132 than the UAVs 104C, 104D. As described above, the first and second UAVs 104A, 104B are outside of the designated airspace 132.

In response to determining that one or more of the UAVs 104 are within the designated airspace 132, the UTM device 106 may take one or more responsive actions based on the circumstances. The responsive actions may take into account (or factor) the number of UAVs 104 in the designated airspace 132, a type of sub-airspace occupied by each of the UAVs 104 in the designated airspace 132 (e.g., occupation of different sub-airspaces may pose different severities of threat), and the type of event that motivated the UTM device 106 to check the proximity of the UAVs 104 to the designated airspace 132. The responsive actions may be stored in the memory 116 as programmed instructions.

In at least one embodiment, the UTM device 106 is configured to continuously monitor the UAVs 104 to provide enhanced situational awareness for the MAVs 102 and the MAV device 110. For example, in response to detecting that the third and fourth UAVs 104C, 104D are within the designated airspace 132, the UTM device 106 may generate a warning message for communication to the MTM device 110 and/or to one or more of the MAVs 102. The warning message provides the respective locations of the two UAVs 104C, 104D.

The warning message may include additional information, such as a vehicle type of each of the third and fourth UAVs 104C, 104D, a unique identifier for each of the UAVs 104C, 104D, and the like. The warning message optionally includes one or more of the status messages received from the UAVs 104, or at least information contained in one or more of the status messages such as identifications and locations of the UAVs 104C, 104D within the designated airspace 132.

The warning message according to an embodiment does not include the respective locations of the other two UAVs 104A, 104B because those UAVs 104A, 104B are outside of the designated airspace 132 and would pose no threat to the MAVs 102. As such, the UTM device 106 filters the location information of the UAVs 104 to provide only relevant information to the MTM device 110. The locations of the first and second UAVs 104A, 104B at the time shown in FIG. 1 is not relevant to the MTM device 110 or the MAVs 102.

Although four UAVs 104 are shown in FIG. 1, the benefits of the filtering by the UTM device 106 may be more appreciated when the UTM device 106 receives status messages from dozens, hundreds, or even thousands of different UAVs 104. The filtering by the UTM device 106 prior to generating the warning message reduces the computational load of the MTM device 110 to unpack and analyze the contents of the UTM device 106 (relative to including more information in the warning message).

In an embodiment, the UTM device 106 generates the warning message in a message format that is different than the message format in which the first communication device 108 receives the status messages from the UAVs 104.

For example, the UTM device 106 may generate the warning message in the ADS-B format. The MTM device 110 may receive the warning message in the ADS-B format and forward the warning message, via the second communication device 112, in the ADS-R format. The second communication device 112 may then broadcast the warning message in the ADS-R format, which is a format that is compatible with the MAVs 102.

In a non-limiting example, the second communication device 112 includes a ground-based transmitter which is used to broadcast messages from the MTM device 110 to the MAVs 102. The MAVs 102 within the broadcast range of the second communication device 112 may receive the warning message and analyze the warning message to discover the locations of the two UAVs 104C, 104D that are potential threats to the MAVs 102.

The information in the warning message increases situational awareness of the pilots of the MAVs 102. For example, the respective locations of the UAVs 104C, 104D may be integrated by a vehicle control system into a graphic user interface that is displayed on a display device for the pilot. The graphic user interface may display the locations of the UAVs 104C, 104D in a dynamic map that also shows locations of other MAVs 102 proximate to the respective MAV 102. Providing the locations of UAV threats to the pilots of the MAVs 102 can enable pilots to divert the MAVs 102, if necessary, to avoid collisions with the UAVs in the proximity.

In an embodiment, the MTM device 110 does not filter the warning message before broadcasting the warning message to the MAVs 102. Optionally, the MAVs 102 may be configured to filter the information in the warning message for relevance to the respective MAV 102. The MAVs 102 that receive the warning message may filter out or ignore any UAVs in the warning message that are determined by the vehicle control system of the MAV 102 to not be a threat.

For example, the vehicle control system onboard each MAV 102 may compare the respective locations of the subset 138 of UAVs 104C, 104D in the warning message to the respective location of the MAV 102 itself. The current location of each MAV 102 may be known based on onboard location sensors, such as GPS receivers. If the UAV locations are beyond a given threshold proximity from the current location and/or a scheduled (or expected) flight path of a respective MAV 102, the vehicle control system may not display those UAV locations to the pilot to avoid providing irrelevant information. Only UAVs in the warning message that are within the threshold proximity of the MAV 102 may be displayed to the pilot.

The threshold proximity may be 1000 ft, 2000 ft, or the like. The threshold proximity may be customizable based on pilot preferences, characteristics of the flight path, or the like.

Three MAVs 102 are shown in FIG. 1, including a first MAV 102A, a second MAV 102B, and a third MAV 102C. The warning message provides the locations of the third and fourth UAVs 104C, 104D. In an example, the vehicle control system onboard the first MAV 102A may determine that the UAVs 104C, 104D are beyond the threshold proximity from the first MAV 102A. The vehicle control system, as a result of the determination that the UAVs 104C, 104D are not threats, may not display the respective locations of the UAVs 104C, 104D to the pilot on the graphic user interface.

In an alternative embodiment, the MTM device 110 is configured to provide proximity-based filtering of the UAVs identified in the warning message instead of (or in addition to) the individual MAVs 102. For example, the MTM device 110 may communicate with the MAVs 102 over time and track the movements of the MAVs 102. In an embodiment in which the MTM device 110 knows the locations of the MAVs 102, upon receipt of the warning device, the MTM device 110 can compare the locations of the UAVs deemed as potential threats (e.g., 104C and 104D) to the locations of the MAVs 102.

The MTM device 110 can take one or more steps to customize the information that is delivered to the MAVs 102 that receive the warning message. For example, upon determining that the warning message is relevant to the second and third MAVs 102B, 102C, but not the first MAV 102A, the MTM device 110 may control the second communication device 112 to transmit the warning message to only the second and third MAVs 102B, 102C (not the first MAV 102A).

The second communication device 112 may accomplish this by being physically aimed towards the intended recipient MAVs 102B, 102C and aimed away from the other MAV 102A. Alternatively, the second communication device 112 may insert information into the warning messages, such as tags or addresses that identify the intended recipients as only the second and third MAVs 102B, 102C.

The UTM device 106 may generate additional warning messages over time similar to the initial warning message, which are also communicated to the MAVs 102. The additional warning messages provide updated location information for the UAVs 104C, 104D. The additional warning messages can also indicate if either of the UAVs 104C, 104D has exited the designated airspace 132, as well as if any other UAV (e.g., 104A or 104B) has entered the designated airspace 132.

In one or more embodiments, in addition to notifying the MAVs of UAV intrusions via the warning message, the UTM device 106 may be configured to take actions to remove and remedy the UAV intrusions.

For example, in response to determining that the two UAVs 104C, 104D are within the designated airspace 132, the UTM device 106 may generate a command message for communication to at least the UAVs 104C, 104D in violation, and optionally to all of the UAVs 104. The command message may be communicated by the first communication device 108 in a message format that is compatible with the UAVs 104, such as the UASTM format. The first communication device 108 may transmit the command message to the third and fourth UAVs 104C, 104D only, via the respective communication links 118.

The command message may notify the operator of the recipient UAV (whether human or automated), that the UAV is in a restricted airspace. The command message may also provide information about how to exit the restricted airspace, such as by directing the UAV 104 to move below the threshold altitude 136, across the boundary 134B, or the like.

Optionally, if the command message is communicated (via broadcasting or individual transmission) to more than just the intruding UAVs 104C, 104D, the command message may provide identification of the UAVs 104 that are in violation.

In one embodiment, if the UAVs 104 are remotely controlled, the UAVs 104 upon receipt of the command message may forward the command message to a remote control device that pilots the respective UAV 104. For example, the remote control device may include a user interface 142 with a display screen. The remote control device may displays a graphic message to the operator on the display screen that the UAV 104 is in restricted airspace and needs to exit the restricted airspace. Optionally, the command message may be communicated to the remote control device from the UTM device 106 via the web server 122 instead of, or in addition to, communicating the command message to the UAVs 104 that are in flight.

The user interface 142 is not limited to being on a remote control device for operating a UAV. The user interface 142 may be a computer that is accessed remotely and is communicatively connected to the web server 122. The level of access to information that is provided to the person utilizing the user interface 142 may be dependent on the credentials of the person input on the user interface 142. For example, first responders, public safety officials, law enforcement, and the like, may be able to access the location information of the UAVs and/or a database of recorded data by the UTM device 106 via the user interface 142.

Optionally, the UTM device 106 may be configured to take additional actions in response to detecting one or more UAVs 104 that are within the designated airspace 132. For example, the UTM device 106 may generate a message to notify authorities (e.g., law enforcement), owners and/or operators of the real estate and/or airspace occupied by the intruding UAVs 104C, 104D, and/or the like. The notifications may be communicated via the web server 122 and/or the first communication device 108.

The UTM device 106 optionally may log a record of the detected intrusion in a database, such as a database in the memory 116 or in the web server 122. The record can include the identities of the intruding UAVs 104C, 104D, the locations of the UAVs 104C, 104D, a time stamp, and other associated information.

The responses described above may be triggered by the detection of one or more UAVs 104 occupying the designated airspace 132. For example, once the boundaries of the designated airspace 132 are defined, the UTM device 106 can compare the respective locations of the UAVs 104 to the designated airspace 132 each time new status messages are received from the UAVs 104.

Optionally, the UTM device 106 may also operate based on received queries and/or commands. For example, the MTM device 110 or one of the MAVs 102 may communicate a query message for the UTM device 106. The query message may provide boundaries and/or positional coordinates of a designated airspace. The MTM device 110 and/or the MAV 102 may generate the query to determine whether a designated airspace is occupied by any UAVs 104. For example, the MTM device 110 and/or MAV 102 may submit the query message when planning a flight path or replanning (e.g., modifying) a flight path. Prior to settling on the flight path the MTM device 110 and/or MAV 102 may submit the proposed flight path to the UTM device 106 within the query message.

The UTM device 106 may compare the current locations of the UAVs 104 that are being monitored to the designated airspace defined in the query message. The UTM device 106 may generate a response message for communication back to the source of the query. The response message may provide the locations of any UAVs located within or proximate to the designated airspace defined in the query.

In one or more embodiments, the UTM device 106 operate to provide traffic preemption and/or prioritization. For example, the UTM device 106 can be used to clear UAVs 104 from an airspace, at least temporarily, to provide a right-of-way for at least one MAV 102 through the airspace. In a situational example, the MTM device 110 and/or a specific MAV 102 may determine that the specific MAV 102 needs to divert from a planned flight path through an airspace that is currently unrestricted to UAV traffic (e.g., the non-designated airspace 133), such as for an emergency landing.

The MTM device 110 and/or the MAV 102 may generate a command message that identifies the boundaries and/or positional coordinates of the desired flight path. The command message may also include additional information, such as a time period that the desired flight path should be void of other traffic to avoid collisions. The UTM device 106 may receive the command message from the MTM device 110. The UTM device 106 classifies the airspace identified in the command message as the designated airspace.

The UTM device 106 determines if any UAVs 104 are in or proximate to (e.g., within 1000 feet of, within 2000 feet of, or the like) the designated airspace reserved for the emergency landing of the MAV. In response to identifying one or more UAVs 104 either in or proximate to the reserved airspace, the UTM device 106 generates a command message for communication to the UAVs 104 in or proximate to the reserved airspace. The command message may identify the airspace that is temporarily restricted for UAV traffic and the time period during which that airspace is restricted. The command message may also order specific UAVs 104 within the designated airspace to exit the designated airspace. By generating the command message to order UAVs 104 to avoid the designated airspace that is temporarily reserved for the MAV 102, the UTM device 106 can clear the path for the MAV 102 to reduce the risk of collisions.

Figure 2:
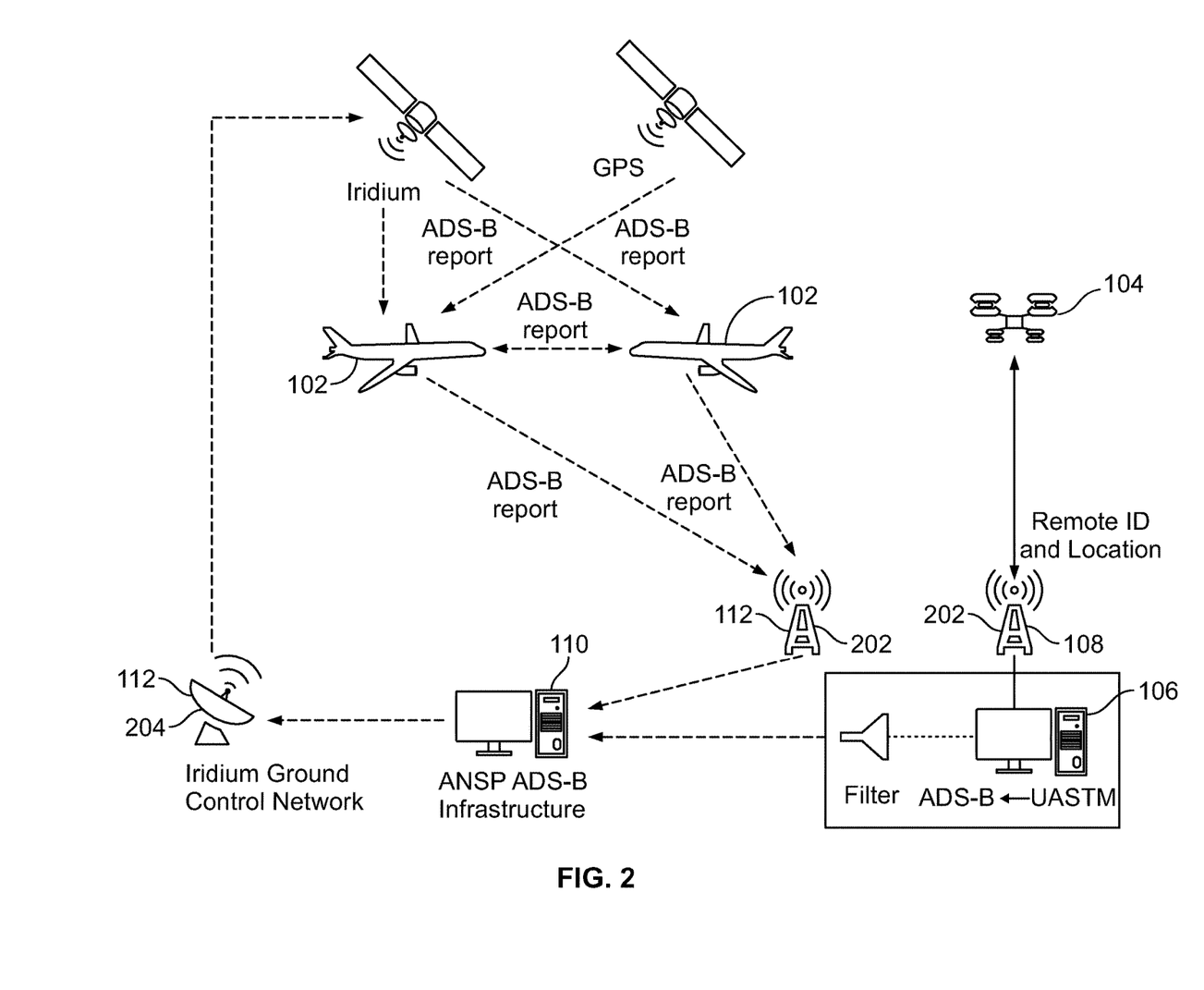
FIG. 2 illustrates the communication system, according to an embodiment of the present disclosure.

FIG. 2 illustrates the communication system 100 according to one embodiment. The embodiment shown in FIG. 2 may be a more specific version of the schematic diagram shown in FIG. 1. The embodiments described herein are not limited to the specific components and arrangement shown in FIG. 2.

In FIG. 2, the UAV 104 transmits its remote identification and location in a status message to the first communication device 108. The UAV 104 may be a quad-copter drone. The first communication device 108 may be or include a ground-based receiver device 202, such as an antenna tower.

The status message is communicated in the UASTM format. The first communication device 108 forwards the status message to the UTM device 106, which analyzes the information. The UTM device 106 filters the data based on relevancy or threat level, which may correspond at least in part to proximity of the UAV 104 to a designated airspace that is reserved, at least temporarily, for MAV 102 traffic. The UTM device 106 generates an outgoing message (e.g., a warning message) in the ADS-B format.

The MTM device 110 receives the outgoing message from the UTM device 106. The MTM device 110 controls the one or more second communication devices 112 to broadcast the outgoing message in the ADS-R format.

In an embodiment, the one or more second communication devices 112 include a ground-based transmitter 204 that broadcasts the message. The transmitter 204 may be part of a ground control network referred to as Iridium. The message is received by one or more satellites 206 that direct the message to the MAVs 102.

The MAVs 102 may be commercial jets. The MAVs 102 communicate with each other and the MTM device 110 using the ADS-B message format. In an embodiment the one or more second communication devices 112 includes a ground-based receiver device 202, such as an antenna tower, that receives ADS-B messages from the MAVs 102 and forwards the messages to the MTM device 110.

Figure 3:
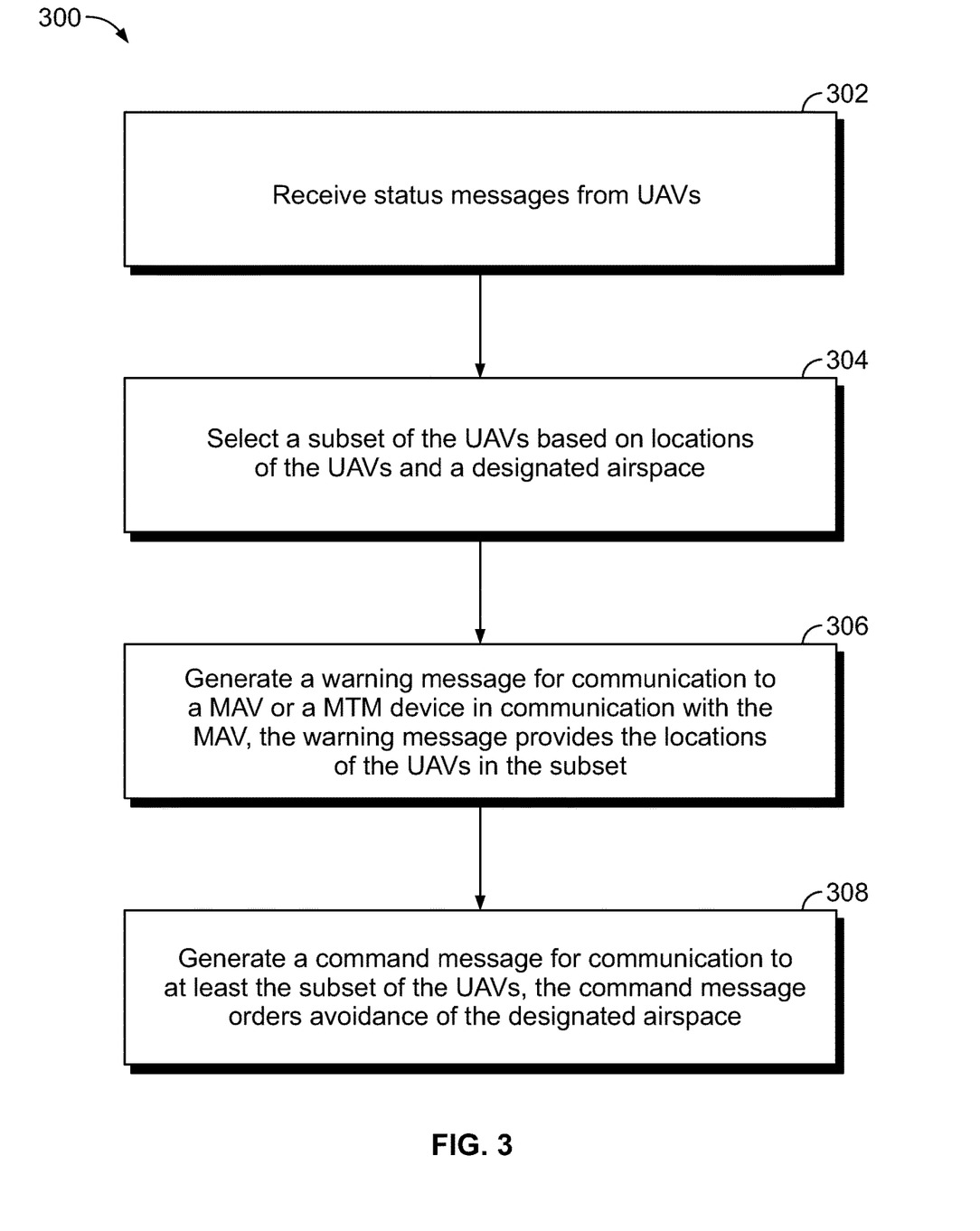
FIG. 3 is a flow chart of a method for communicating data between manned and unmanned aerial vehicle systems, according to an embodiment of the present disclosure.

FIG. 3 is a flow chart 300 of a method for communicating data between manned and unmanned aerial vehicle systems according to an embodiment. The method may be performed at least in part by the UTM device 106 shown in FIGS. 1 and 2. Optionally, the method may include additional steps, fewer steps, and/or different steps than the steps shown in FIG. 3.

At 302, status messages from UAVs are received. The status messages may include identification of the specific UAV that generated the status message and the location of the specific UAV, such as within a coordinate system. The status messages may be received in a first message format, such as the UASTM format.

At 304, a subset of one or more of the UAVs is selected based on a comparison between the respective locations of the UAVs and a designated airspace. The designated airspace may be a defined space that is at least temporarily closed to UAV traffic. For example, the designated airspace may be reserved for MAV traffic. The comparison may include determining relative proximities of the UAVs to the designated airspace. The subset may be selected to include (i) one or more UAVs determined to be within the designated airspace and/or (ii) one or more UAVs determined to be outside of the designated airspace but within a threshold proximity or buffer distance from the designated airspace. The subset selection process in step 304 effectively filters the information received in the status messages based on relevance and proximity to the designated airspace.

At 306, a warning message is generated for communication to at least one MAV or the MTM device that is communicatively connected to the at least one MAV. The warning message may provide the respective location of each UAV in the subset. The locations of the UAVs in the subset may be displayed or otherwise communicated to a pilot or pilots of the at least one MAV to enhance situational awareness and reduce the risk of collision between a MAV and a UAV. Due to the filtering at step 304, the warning message may contain less information than the amount of information received in the status messages from the UAVs.

At 308, a command message is generated for communication to at least the UAVs in the subset (and optionally to other UAVs that are located farther away from the designated airspace). The command message may identify the boundaries and/or coordinates of the designated airspace that is prohibited for UAV traffic, and may order avoidance of the designated airspace by the recipient UAVs. The command message can be used to establish and/or maintain a right-of-way for certain vehicles, such as MAVs, to reduce the risk of collision. The command message includes filtered information deemed relevant to at least the UAVs in the subset.

Information that is deemed not applicable or relevant to the UAVs in the subset is not included in the command message. Such information that may not be relevant can include boundaries and/or coordinates of another designated airspace that is not proximate to the UAVs in the subset and/or through which the UAVs in the subset are not expected to travel. This command message may be communicated in a specific format that is applicable or appropriate for UAV communications, such as the UASTM format.

Optionally, the method may be used to establish and/or maintain a right-of-way for UAVs, at the expense of altering the flights of other types of vehicles, such as MAVs. For example, there may be a designated airspace that is at least temporarily closed to MAV traffic. The designated airspace may provide a path for an unmanned flight-of-life emergency vehicle to pass through a controlled airspace, typically occupied and/or reserved for MAV traffic, to either approach a person in need of help or to approach a hospital. In such a situation, a command message (different from the command message at step 308) may be generated for communication to at least some MAVs in and/or proximate to the designated airspace that is temporarily reserved for the emergency UAV. The command message may identify the boundaries and/or coordinates of the designated airspace that is prohibited for MAV traffic, and may order avoidance of the designated airspace by the recipient MAVs, for at least a designated amount of time. This command message may be communicated in a specific format that is applicable or appropriate for MAV communications, such as the ADS-B message format.

As used herein, the term "control device," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the UTM device 106 (and the MTM device 110) may be or include one or more processors that are configured to control operation, as described herein.

The UTM device 106 and the MTM device 110 are configured to execute a set of instructions that are stored in one or more data storage units or elements (such as one or more memories), in order to process data. The data storage units may also store data or other information as desired or needed. The data storage units may be in the form of an information source or a physical memory element within a processing machine.

The set of instructions may include various commands that instruct the UTM device 106 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing devices, such as the UTM device 106 and the MTM device 110. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the UTM device 106 and the MTM device 110 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

As described herein, certain embodiments of the present disclosure provide enhanced situational awareness of nearby aerial vehicles and reduce the risk of collisions between manned and unmanned aerial vehicles. Further, certain embodiments of the present disclosure provide traffic preemption or prioritization to at least temporarily clear UAVs from a designated path through a mixed airspace to provide a right-of-way for one or more MAVs. Certain embodiments also provide automated detection of UAVs that enter into unpermitted airspace, and timely communication of the detection with relevant information to one or more MAVs to enable avoidance of the rogue, encroaching UAVs.

Further, the disclosure comprises embodiments according to the following clauses:

Clause 1. A communication system comprising:
a traffic relay (TR) device for locating unmanned traffic in a controlled airspace, the TR device comprising one or more processors configured to perform the steps of:
receive a status message from an unmanned aerial vehicle (UAV) providing identification and location information of the UAV; and
generate a warning message for communication to at least one manned aerial vehicle (MAV) or a manned traffic manager (MTM) device that is communicatively connected to the at least one MAV, the warning message being based on a comparison of the location of the UAV to a designated airspace.

Clause 2. The communication system of Clause 1, wherein the warning message includes the identification and location information of the UAV from the status message.

Clause 3. The communication system of Clause 1 or Clause 2, wherein the status message is in a first message format, and the TR device generates the warning message in a second message format that is different from the first message format.

Clause 4. The communication system of Clause 3, wherein the first message format is an unmanned aircraft systems traffic management format, and the second message format is an automatic dependent surveillance broadcast (ADS-B) format.

Clause 5. The communication system of Clause 4, further comprising the MTM device, wherein the MTM device is configured to receive the warning message in the ADS-B format and rebroadcast the warning message in an automatic dependent surveillance rebroadcast (ADS-R) format for receipt by the at least one MAV.

Clause 6. The communication system of any of Clauses 1-5, further comprising the MTM device, wherein the MTM device is communicatively connected to a ground-based transmitter and is configured to control the ground-based transmitter to broadcast the warning message for receipt by the at least one MAV during a flight of the at least one MAV.

Clause 7. The communication system of any of Clauses 1-6, wherein the UAV is one of a plurality of UAVs and wherein the TR device is configured to select a subset of the UAVs based on proximity to the designated airspace, wherein the warning message is void of information directed to a non-selected subset of one or more of the UAVs based on the non-selected subset being located farther from the designated airspace than the subset of the UAVs.

Clause 8. The communication system of Clause 7, wherein the TR device is further configured to generate a command message for communication to the subset of the UAVs, wherein the command message orders the subset of the UAVs to avoid the designated airspace to provide a right-of-way for MAV traffic.

Clause 9. The communication system of any of Clauses 1-8, further comprising one or more communication devices communicatively connected to the TR device, wherein the one or more communication devices are configured to receive the status message from the UAV via a 5G wireless communication link.

Clause 10. The communication system of any of Clauses 1-9, wherein the TR device is configured to determine the designated airspace based on receipt of a query message generated by the at least one MAV or the MTM device, the query message providing one or more of boundaries or positional coordinates of the designated airspace.

Clause 11. The communication system of any of Clauses 1-10, wherein the designated airspace is a predefined airspace that restricts UAV traffic to provide a right-of-way for MAV traffic, and one or more of boundaries or positional coordinates of the designated airspace are stored in a memory device of the TR device.

Clause 12. The communication system of Clause 11, wherein the designated airspace includes one or more of a predefined class of airspace according to a classification scheme, a scheduled travel path of the at least one MAV, an airspace across a jurisdictional boundary, or an airspace above a threshold altitude.

Clause 13. A communication system comprising:
a traffic relay (TR) device including one or more processors and communicatively connected to one or more communication devices, the TR device configured to receive, via the one or more communication devices, status messages from multiple unmanned aerial vehicles (UAVs), the status messages providing identifications and locations of the UAVs,
wherein the TR device determines a designated airspace that at least temporarily restricts UAV traffic to provide a right-of-way for manned aerial vehicle (MAV) traffic, and generates a command message for communication to at least some of the UAVs identified in the status messages, the command message ordering the UAVs that receive the command message to avoid the designated airspace.

Clause 14. The communication system of Clause 13, wherein the TR device is configured to select the at least some of the UAVs that are to receive the command message based on proximity of the UAVs to the designated airspace.

Clause 15. The communication system of Clause 13 or Clause 14, wherein the TR device determines the designated airspace based on a notification message received at the TR device from a remote source, the notification message identifying the designated airspace and a period of time during which to avoid the designated airspace.

Clause 16. The communication system of Clause 15, wherein the notification message is received in a first message format, and the TR device generates the command message in a second message format that is different from the first message format.

Clause 17. The communication system of Clause 16, wherein the first message format is an automatic dependent surveillance broadcast (ADS-B) format, and the second message format is an unmanned aircraft systems traffic management format.

Clause 18. The communication system of any of Clauses 13-17, wherein the one or more communication devices communicatively connected to the TR device receive the status messages from the UAVs via a 5G wireless communication link.

Clause 19. The communication system of any of Clauses 13-18, wherein the TR device determines the designated airspace based on a query message received at the TR device from a remote source, and the TR device generates a response message for communication to the remote source in response to the query message, the response message providing the location of each UAV that is within the designated airspace.

Clause 20. The communication system of any of Clauses 13-19, wherein the TR device determines that a subset of one or more of the UAVs is located within the designated airspace based on a comparison between the respective locations of the UAVs and the designated airspace, and the TR device generates a warning message for communication to the at least one MAV or a manned traffic manager (MTM) device that is communicatively connected to the at least one MAV, the warning message providing the location of each UAV in the subset.

Clause 21. The communication system of any of Clauses 13-20, wherein the designated airspace includes one or more of a predefined class of airspace according to a classification scheme, a scheduled travel path of the at least one MAV, an airspace across a jurisdictional boundary, or an airspace above a threshold altitude, and one or more of boundaries or positional coordinates of the designated airspace is stored in a memory device of the TR device.

Clause 22. A method comprising:
receiving, at a traffic relay (TR) device including one or more processors, a status message from an unmanned aerial vehicle (UAV), the status message providing an identification and a location of the UAV; and
generating a warning message for communication to at least one manned aerial vehicle (MAV) or a manned traffic manager (MTM) device that is communicatively connected to the at least one MAV, the warning message being based on a comparison of the location of the UAV to a designated airspace.

Clause 23. The method of Clause 22, wherein the status message is received in an unmanned aircraft systems traffic management format, and the warning message is generated in an automatic dependent surveillance broadcast (ADS-B) format.

Clause 24. The method of Clause 22 or Clause 23, wherein the UAV is one of a plurality of UAVs and the status message that is received is one of multiple status messages received from the UAVs providing the identification and location information of each of the UAVs, wherein the method further comprises:

selecting, via the TR device, a subset of one or more of the UAVs based on proximity of the UAVs to the designated airspace, wherein generating the warning message includes providing the respective location of each UAV in the subset, the warning message being void of information directed to a non-selected subset of one or more of the UAVs, the non-selected subset being located farther from the designated airspace than the subset of the UAVs.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A communication system comprising:
   a manned traffic manager (MTM) device configured to be communicatively connected to a plurality of manned aerial vehicles (MAVs) and to receive location information of the MAVs from the MAVs, the location information including at least one of current locations of the MAVs or scheduled flight paths of the MAVs; and
   a traffic relay (TR) device for locating unmanned traffic in a controlled airspace, the TR device comprising one or more processors configured to:
      receive status messages from a plurality of unmanned aerial vehicles (UAVs), the status messages providing identification and location information of UAVs;
      identify a subset of the UAVs as potential threat UAVs based on the location information indicating that the potential threat UAVs are within a designated airspace; and
      generate a warning message for communication to the MTM device, the warning message including respective locations of the potential threat UAVs,
   wherein the MTM device is configured to:
      receive the warning message and compare the locations of the potential threat UAVs to the location information of the MAVs;
      identify a subset of the MAVs as intended recipient MAVs of the warning message based on a proximity between the locations of the potential threat UAVs and the location information of the MAVs; and
      direct communication of the warning message to the intended recipient MAVs.

2. The communication system of claim 1, wherein the TR device is configured to receive the status messages in a first message format, and to generate the warning message in a second message format that is different from the first message format.

3. The communication system of claim 2, wherein the first message format is an unmanned aircraft systems traffic management format, and the second message format is an automatic dependent surveillance broadcast (ADS-B) format.

4. The communication system of claim 3, wherein the MTM device is configured to receive the warning message in the ADS-B format and to control a communication device to rebroadcast the warning message in an automatic dependent surveillance rebroadcast (ADS-R) format for receipt by the intended recipient MAVs.

5. The communication system of claim 1, wherein the MTM device is communicatively connected to a ground-based transmitter and the MTM device is configured to control the ground-based transmitter to broadcast the warning message for receipt by the intended recipient MAVs while in flight.

6. The communication system of claim 1, wherein the TR device is configured to generate the warning message to be void of information related to the UAVs that are not the potential threat UAVs.

7. The communication system of claim 1, wherein the TR device is further configured to generate a command message for communication to the potential threat UAVs, wherein the command message orders the potential threat UAVs to exit the designated airspace to provide a right-of-way for MAV traffic.

8. The communication system of claim 1, further comprising one or more communication devices communicatively connected to the TR device, wherein the one or more communication devices are configured to receive the status messages from the UAVs via a 5G wireless communication link.

9. The communication system of claim 1, wherein the TR device is configured to determine the designated airspace based on receipt of a query message generated by the MTM device, the query message providing one or more of boundaries or positional coordinates of the designated airspace.

10. The communication system of claim 1, wherein the designated airspace is a predefined airspace that restricts UAV traffic to provide a right-of-way for MAV traffic, and one or more of boundaries or positional coordinates of the designated airspace are stored in a memory device of the TR device.

11. The communication system of claim 1, wherein the MTM device is configured to direct communication of the warning message to the intended recipient MAVs for depicting of the locations of the potential threat UAVs in a map on graphical user interface displayed by a respective display device onboard each of the intended recipient MAVs.

12. The communication system of claim 1, wherein the MTM device is configured to direct communication of the warning message to the intended recipient MAVs by at least one of controlling a communication device to transmit the warning message to only the intended recipient MAVs or inserting a tag into the warning message that identifies the intended recipient MAVs.

13. A communication system comprising:
a traffic relay (TR) device including one or more processors and communicatively connected to one or more communication devices, the TR device configured to receive, via the one or more communication devices, status messages from multiple unmanned aerial vehicles (UAVs) and a notification message from a remote source, the status messages providing identification and location information of the UAVs, the notification message providing a flight path of a manned aerial vehicle (MAV) on a scheduled flight and a time of the scheduled flight,
wherein the TR device determines a designated airspace that is restricted to UAV traffic based on the flight path and identifies a subset of the UAVs as potential threat UAVs based on the location information indicating that the potential threat UAVs are at least one of within or proximate to the designated airspace, the TR device configured to generate a command message for communication to the potential threat UAVs, the command message identifying boundaries of the designated airspace, identifying a time period during which the designated airspace is restricted to UAV traffic, and ordering the potential threat UAVs to avoid or exit the designated airspace during the time period.

14. The communication system of claim 13, wherein the TR device is configured to receive notification message in a first message format, and the TR device generates the command message in a second message format that is different from the first message format.

15. The communication system of claim 14, wherein the first message format is an automatic dependent surveillance broadcast (ADS-B) format, and the second message format is an unmanned aircraft systems traffic management format.

16. A method comprising:
receiving, at a traffic relay (TR) device including one or more processors, status messages from a plurality of unmanned aerial vehicles (UAVs), the status messages providing identification and location information of the UAVs;
identifying a subset of the UAVs as potential threat UAVs based on the location information indicating that the potential threat UAVs are within a designated airspace;
generating a warning message for communication to a manned traffic manager (MTM) device that is communicatively connected to a plurality of manned aerial vehicles (MAVs), the warning message including respective locations of the potential threat UAVs;
receiving, at the MTM device, the warning message and location information of the MAVs, the location information of the MAVs including at least one of current locations of the MAVs or scheduled flight paths of the MAVs;
comparing the locations of the potential threat UAVs to the location information of the MAVs to identify a subset of the MAVs as intended recipient MAVs of the warning message based on a proximity between the locations of the potential threat UAVs and the location information of the MAVs; and
directing communication of the warning message to the intended recipient MAVs.

17. The method of claim 16, wherein the status messages are received in an unmanned aircraft systems traffic management format, and the warning message is generated in an automatic dependent surveillance broadcast (ADS-B) format.

18. The method of claim 16, wherein the warning message is generated to be void of information directed to the UAVs that are not the potential threat UAVs.

19. The method of claim 16, further comprising controlling a respective display device onboard each of the intended recipient MAVs to display a map on a graphical user interface, the map depicting the locations of the potential threat UAVs.

20. The method of claim 16, wherein directing the communication of the warning message to the intended recipient MAVs comprises at least one of controlling a communication device to transmit the warning message to only the intended recipient MAVs or inserting a tag into the warning message that identifies the intended recipient MAVs.

* * * * *